(12) United States Patent
Lai

(10) Patent No.: US 8,089,272 B2
(45) Date of Patent: Jan. 3, 2012

(54) ANGLE SENSOR FOR MEASURING ANGULAR PARAMETER OF ROTARY MEMBER

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 383 days.

(21) Appl. No.: 12/422,215

(22) Filed: Apr. 10, 2009

(65) Prior Publication Data

US 2010/0102800 A1    Apr. 29, 2010

(30) Foreign Application Priority Data

Oct. 23, 2008 (CN) .......................... 2008 1 0305095

(51) Int. Cl.
*G01B 7/30* (2006.01)
(52) U.S. Cl. ................................. 324/207.25
(58) Field of Classification Search .............. 324/207.25
See application file for complete search history.

(56) References Cited

U.S. PATENT DOCUMENTS 5,939,879 A * 8/1999 Wingate et al. .......... 324/207.17

* cited by examiner

*Primary Examiner* — Jay Patidar
(74) *Attorney, Agent, or Firm* — Altis Law Group, Inc.

(57) ABSTRACT

An angle sensor for measuring angular parameters of a rotary member includes a shaft, a rotary disc being connected to the rotary member and rotatable about the shaft, a number of electromagnetic elements disposed on the rotary disc, a precision controller electrically connected to the rotary disc for selectively magnetizing the electromagnetic elements, a magnetic sensor configured for sensing the magnetic field of the magnetized electromagnetic elements and generating sensing signals every time a magnetized electromagnetic element passes under the magnetic sensor, a mounting plate configured for mounting the magnetic sensor, the mounting plate being fastened to the shaft, and a calculator electrically connected to the magnetic sensor for receiving the sensing signals, the calculator being configured for calculating the angular parameters of the rotary member according to the received sensing signals, a corresponding elapsed time and the angle between adjacent magnetized electromagnetic elements.

7 Claims, 2 Drawing Sheets

ANGLE SENSOR FOR MEASURING ANGULAR PARAMETER OF ROTARY MEMBER

BACKGROUND

1. Technical Field

The present disclosure relates to sensors, and particularly, to an angle sensor using magnetism to measure a rotated angle and the angular velocity of a rotary member.

2. Description of Related Art

One way of measuring a rotated angle or the angular velocity of a rotating body is by an angle sensor.

An angle sensor may includes a rotating disc, a light emitter, and a light receiver. The rotating disc defines a number of through holes. The through holes are distributed around the periphery of the rotating disc at a predetermined angle. The light emitter and the light receiver are positioned on opposite sides of the rotating disc, at the periphery of the rotating disc, and aligned with each other. In operation, the rotating disc is driven by a rotary member. When a through hole passes the light emitter, light from the emitter passes through the through hole and impinges on the light receiver. Knowing the radial angle between each through holes and measuring the number of times the light impinges on the light receiver per unit time, the angle sensor can measure the rotated angle and the angular velocity of the rotating disc.

Because the interval between adjacent through holes is fixed, the precision of the current angle sensor cannot be adjusted, and thus the applicability of the angle sensor is limited to one precision measurement.

What is needed, therefore, is an angle sensor which can overcome the above-mentioned problems.

BRIEF DESCRIPTION OF THE DRAWINGS

Many aspects of the present embodiments can be understood with reference to the figures. The components in the figures are not necessarily drawn to scale, the emphasis instead being placed upon clearly illustrating the principles of the present embodiments. Moreover, in the figures, like reference numerals designate corresponding parts throughout the several views.

DETAILED DESCRIPTION

Figure 1:
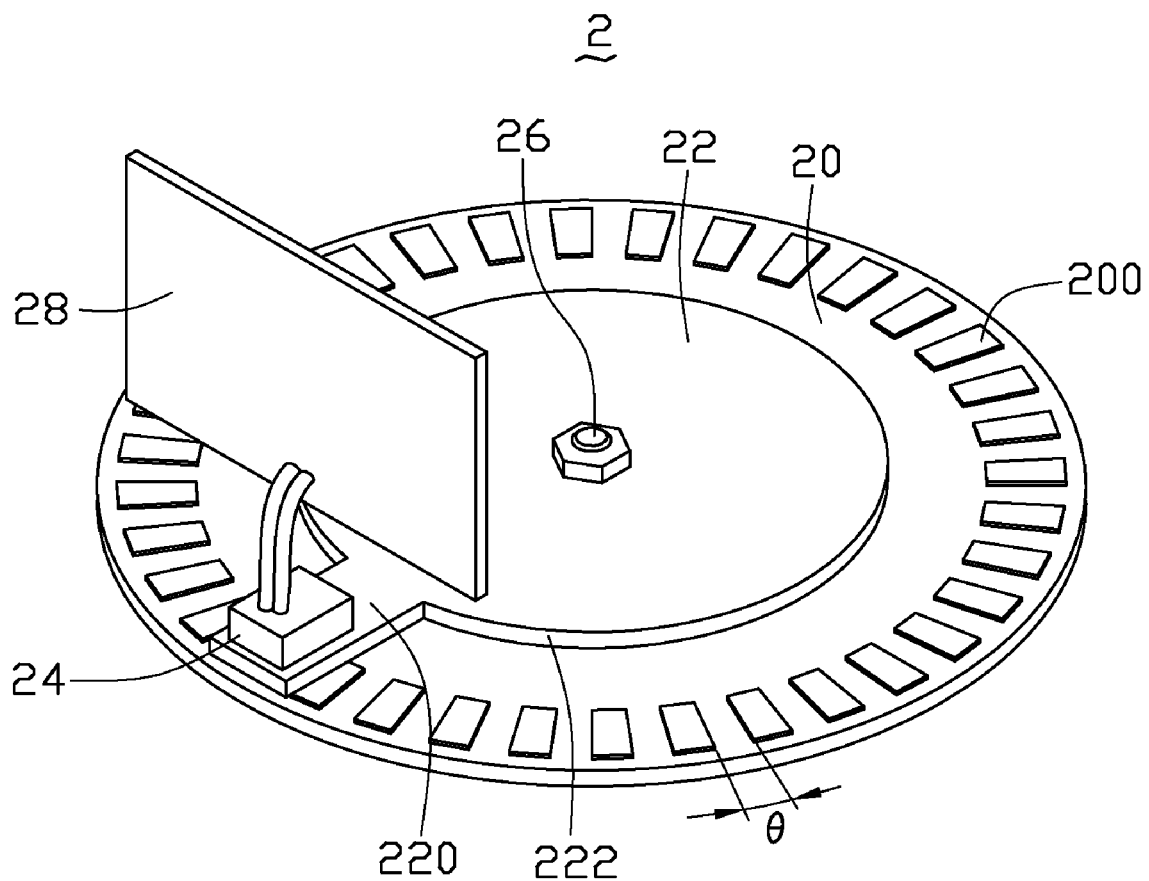
FIG. 1 is a schematic view of an angle sensor in accordance with an embodiment.
Figure 2:
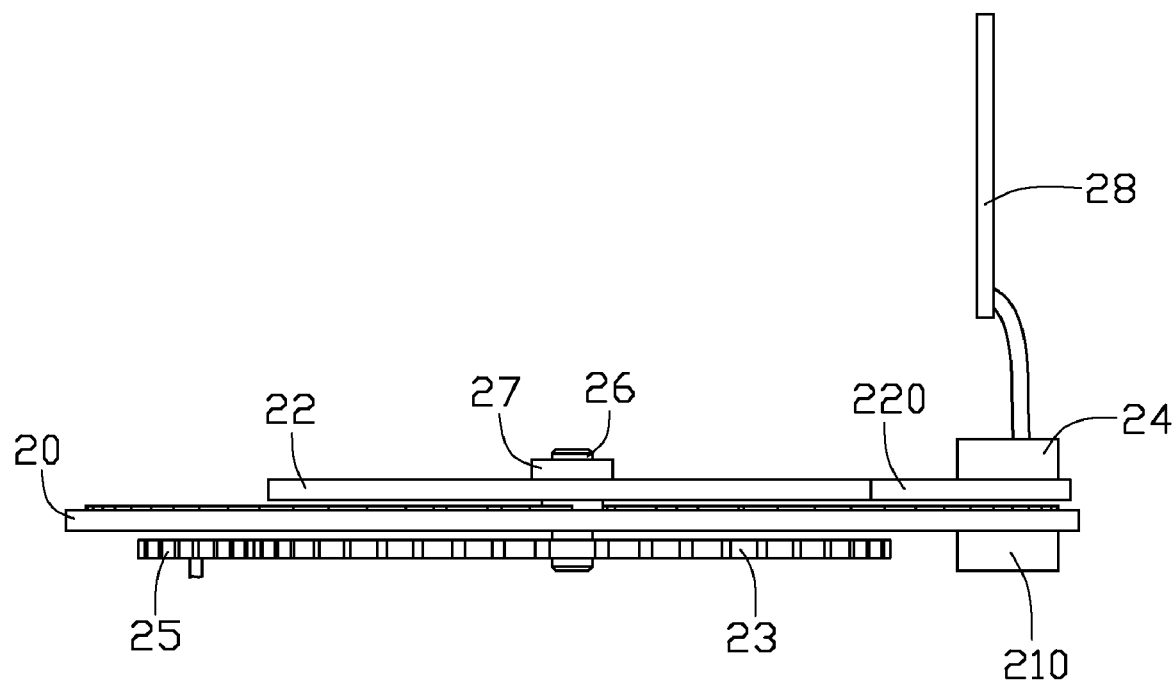
FIG. 2 is a side view of the angle sensor of FIG. 1.

Referring to FIG. 1 and FIG. 2, an angle sensor 2 in accordance with an exemplary embodiment is disclosed. The angle sensor 2 includes a rotary disc 20, a mounting plate 22, a magnetic sensor 24, a shaft 26, a fastener 27, a calculator 28, and a precision controller 210. The rotary disc 20 includes a gear 23. The rotary disc 20 is connected to a rotary member 25 by the gear 23. The mounting plate 22 is fastened to the shaft 26 by the fastener 27. The magnetic sensor 24 is mounted on the mounting plate 22. The calculator 28 is electrically connected to the magnetic sensor 24 and is configured for receiving sensing signals generated by the magnetic sensor 24. The precision controller 210 is connected to the rotary disc 20. The precision controller 210 can adjust the precision with which the rotation rate of the rotary member can be measured.

The rotary disc 20 includes a number of electromagnetic elements 200. The electromagnetic elements 200 are disposed on the rotary disc 20 around the circumference at a predetermined angle θ. The angle θ is the smallest angle measurable by the angle sensor 2. The electromagnetic element 200 can be any electromagnetic material, such as iron with a coil of wire around it. The precision controller 210 is battery operated. The precision controller 210 can selectively magnetize the electromagnetic element 200 by applying a current to the coil of wire. The number N of the electromagnetic elements 200 can be calculated by a formula: $N=360°/\theta$.

The mounting plate 22 includes a mounting arm 220. The mounting arm 220 extends from the circumferential side 222 of the mounting plate 22 in the radial direction. The mounting arm 220 covers the area where the electromagnetic elements 200 are disposed on. The magnetic sensor 24 is mounted near the end of the mounting arm 220 and directly above the path of the electromagnetic elements 200. Therefore, the magnetic sensor 24 can sense the magnetic field of the magnetized electromagnetic elements 200 passing under the magnetic sensor 24.

Because the magnetic sensor 24 can only sense the magnetized electromagnetic elements 200 when they are magnetized, the precision of the angle sensor 2 can be changed by having the precision controller 210 selectively magnetizing the electromagnetic elements 200.

For example, if the smallest angle θ measurable by the angle sensor 2 is 1 degree. The angle θ between adjacent electromagnetic elements 200 is 1 degree. Therefore, the number N of the electromagnetic elements 200 disposed on the rotary disc 20 is 360. If the precision of the measurement is 1 degree, the precision controller 210 magnetizes all of the 360 electromagnetic elements 200 during the measurement. In this case, every time the rotary disc 20 rotates 1 degree, the magnetic sensor 24 generates a sensing signal. If the precision of the measurement needs to be adjusted to 2 degrees, the precision controller 210 magnetizes every other electromagnetic element 200, that is, 180 out of the 360 electromagnetic elements 200 are magnetized. In this case, every time the rotary disc 20 rotates 2 degrees, the magnetic sensor 24 generates the sensing signal.

In operation, the precision of the angle sensor 2 has been preset by the precision controller 210. Every time an electromagnetic element 200 passes under the magnetic sensor 24, the magnetic sensor 24 senses the magnetic field and transfers the sensing signal to the calculator 28. The calculator 28 receives the sensing signal and calculates the rotated angle of the rotary disc 20 by multiplying the number of the sensing signals and the precision. Furthermore, the calculator 28 also can calculate a time interval between adjacent signals to compute the angular velocity of the rotary disc 20 by dividing the precision by the interval time.

The angle sensor 2 uses magnetism to calculate the rotated angle and angular velocity of the rotary member 25. The precision of the angle sensor 2 can thus be adjusted by manipulating the electromagnetic elements 200. Therefore, the angle sensor 2 is more convenient to be applied in the measurements requiring different precision.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An angle sensor for measuring angular parameters of a rotary member, the angle sensor comprising:
a shaft;
a rotary disc;

a plurality of electromagnetic elements disposed on the rotary disc around the circumference at a predetermined angle, the rotary disc being connected to the rotary member and rotatable about the shaft;

a precision controller electrically connected to the rotary disc for selectively magnetizing the electromagnetic elements;

a magnetic sensor configured for sensing the magnetic field of the magnetized electromagnetic elements and generating sensing signals every time a magnetized electromagnetic element passes under the magnetic sensor;

a mounting plate configured for mounting the magnetic sensor, the mounting plate being fastened to the shaft; and a calculator electrically connected to the magnetic sensor for receiving the sensing signals, the calculator being configured for calculating the angular parameters of the rotary member according to the received sensing signals, a corresponding elapsed time and the angle between adjacent magnetized electromagnetic elements.

2. The angle sensor as claimed in claim 1, wherein the predetermined angle is the smallest angle measurable by the angle sensor.

3. The angle sensor as claimed in claim 1, wherein the mounting plate comprises a mounting arm which extends from the circumferential side of the mounting plate in the radial direction and whose end covers the area where the electromagnetic elements are disposed on, and the magnetic sensor is mounted near the end of the mounting arm.

4. An angle sensor for obtaining angular parameters of a rotary object, the angle sensor comprising:

a rotating disc configured for rotating with the rotary object;

a plurality of electromagnetic elements formed on the edge of the rotating disc at a predetermined angle;

a controlling element configured for selectively magnetizing the electromagnetic elements;

a sensing element positioned above the edge of the rotating disc and configured for sensing magnetized electromagnetic element and generating sensed signals; and a calculator configured for calculating the angular parameters of the rotary object according to the sensed signals.

5. The angle sensor as claimed in claim 4, wherein the predetermined angle is the smallest angle measurable by the angle sensor.

6. The angle sensor as claimed in claim 4, wherein the angle sensor further comprises a mounting plate configured for mounting the sensing element.

7. The angle sensor as claimed in claim 6, wherein the mounting plate comprises a mounting arm which extends from the circumferential side of the mounting plate in the radial direction and whose end covers the area where the electromagnetic elements are disposed on, and the sensing element is mounted near the end of the mounting arm.

* * * * *